Patented Apr. 25, 1944

2,347,377

UNITED STATES PATENT OFFICE 2,347,377

ORGANIC INSECTICIDE

James William Swaine, Bayside, N. Y., assignor to General Chemical Company, New York, N. Y., a corporation of New York No Drawing. Application May 4, 1938,
Serial No. 205,991

8 Claims. (Cl. 167—15)

This invention relates to insecticides for controlling codling moth larvae.

In accordance with the present invention it has been found that compounds containing the xanthone structure possess toxicity against codling moth larvae. By the term "xanthone structure" as used herein I mean to include (a) xanthone, (b) the corresponding structures in which sulfur replaces oxygen, and (c) the products obtained by introducing one or more than one substituent element or radical to replace one or more of the hydrogens in the compounds of (a) and (b).

The insecticides of the present invention may be applied to fruit, foliage, or other food of codling moth larvae. They are compatible with and therefore may be used in combination with other stomach insecticides, contact insecticides, fungicides, and the supplementary materials such as hydrated lime, diluents, sticking, spreading, and wetting agents, etc., except oils, commonly used in combination with stomach poison insecticides. They may be used dispersed in liquids or in dry form as dusts.

The compounds of the present invention have been found to be relatively stable under the usual conditions of use as compared with previously proposed organic insecticides and for this reason better retain their high toxicity to codling moth larvae. Furthermore, the compounds of the present invention, especially those containing in the molecule only carbon, hydrogen, and oxygen, are, as a class, relatively non-toxic to warm-blooded animals and human beings; hence they may be applied to edible plants without danger of poisoning, such as attends the use of lead arsenate and other formerly known insecticides.

The preferred compounds of the present invention are those of low volatility and very low solubility in water. These properties permit the retention of the insecticides on foliage or fruit, etc., to which they are applied, for relatively long periods and hence the period between applications may be extended and the dosage lowered as compared with compounds which readily evaporate from treated plants or are easily washed therefrom by rain.

It has been found that for combatting codling moth larvae xanthone is outstandingly superior even to most of the other insecticides of the invention. In the past lead arsenate has been the most effective insecticide available against this pest. However, the application of lead arsenate to the host, for instance to pome fruit trees, has always been objectionable in view of the highly poisonous nature of this compound and the possibility that traces may remain upon edible portions of the plant to which it is applied. Accordingly the use of lead arsenate as a late season spray has been particularly dangerous from this standpoint.

Xanthone, on the other hand, has been found not only to be at least the equal of lead arsenate as a codling moth larvicide, but to be entirely free from any danger to human beings if taken internally even in amounts greatly in excess of those which may normally remain on edible portions of sprayed plants and fruits. Xanthone, furthermore, has been found to be substantially innocuous to plants to which it has been applied; in conducting comparative tests of xanthone with lead arsenate upon pome fruit trees it was observed that the plants to which the xanthone had been applied were in a healthier, more vigorous and flourishing condition than those upon which lead arsenate had been used.

The following table demonstrates the effectiveness of the insecticides of the present invention. In conducting the tests from five to ten apples were employed. The compounds were applied as aqueous dispersions of three pounds of compound per one hundred gallons of water. The apples were sprayed with the dispersion and allowed to dry so as to provide a film of the insecticide practically completely covering the surface of the apple. Five codling moth larvae were then placed upon each apple. After ten days the number of larvae alive and dead were counted. The toxicity of the individual insecticides is expressed in the table in terms of per cent of larvae dead at the end of ten days. Check tests without insecticide were run for comparative purposes.

Table No. 1

| Compound | Toxicity |
|---|---|
| | Per cent |
| 1. Xanthone | 100 |
| 2. 3-bromo-xanthone | 98 |
| 3. Xanthione | 93.9 |
| 4. Dibromo-xanthone | 76 |
| 5. Methylated xanthone | 70 |
| Blank | 55.6 |

From the above table it will be apparent that the presence of substituent froups in xanthone, while it may reduce the toxicity, does not destroy it entirely and the substituted xanthones, particularly the xanthione and the 3-bromo-xanthone, retain in a large measure the toxicity of the parent compound.

The following results were obtained in field tests in the State of Washington comparing xanthone and lead arsenate for codling moth control in seven different treatments of winesap apple trees. Both insecticides were applied to the trees as suspensions in water—lead arsenate in combination with one pint of mineral oil, 1 pint of kerosene, and ⅛ pound of a spreading agent per 100 gallons of water; xanthone in combination with ¾ pound of hydrated lime and one pound of tar soap per 100 gallons of water. A lead arsenate calyx spray, which was uniform for all treatments, was applied about the middle of May and seven cover sprays were applied distributed through the period from about May 24 to about the middle of August.

*Table No. 2*

| Lead arsenate | | Xanthone | | Total number picked apples | Per cent stung | Per cent wormy | Per cent injured | Per cent clean | Per cent U. S. No. 1 grade |
|---|---|---|---|---|---|---|---|---|---|
| Number of sprays | Mean dosage per 100 gallons | Number of sprays | Mean dosage per 100 gallons | | | | | | |
| | *Pounds* | | *Pounds* | | | | | | |
| 8 | 3 | ----- | ----- | 11,906 | 20.8 | 5.5 | 24.3 | 75.7 | 93.2 |
| 6 | 3 | ----- | ----- | 11,389 | 10.2 | 5.2 | 14.4 | 85.6 | 94.4 |
| 3 | 3 | 2 | 3 | 14,267 | 2.5 | 3.5 | 5.7 | 94.3 | 96.3 |
| 3 | 3 | 5 | 3 | 13,888 | 1.9 | 3.7 | 5.1 | 94.9 | 96.3 |
| 3 | 3 | 5 | 2.1 | 16,058 | 0.5 | 1.6 | 2.0 | 98.0 | 98.4 |
| 1 | 3 | 7 | 3 | 10,902 | 0.6 | 4.2 | 4.6 | 95.4 | 95.8 |
| 1 | 3 | 7 | 2.36 | 11,862 | 0.3 | 1.8 | 2.1 | 97.9 | 98.2 |

It will be noted from the above table that in each of the last three tests reported, an initial lead arsenate calyx spray was followed by seven xanthone cover sprays; in the third and fourth tests, numbering the tests consecutively from top to bottom of the table, the first three sprays applied to the trees were lead arsenate sprays, followed by five sprays of xanthone, and in the second test reported the first six sprays were lead arsenate and the last two sprays were xanthone sprays. The method of controlling codling moth larvae involving the spraying of the trees during the growth of the calyx with lead arsenate and thereafter, during the growth of the fruit, spraying the trees with a compound containing the xanthone structure such as xanthone, is an important feature of this invention.

Conventional measures of efficiency are used in the above table to allow comparison of the different treatments. A "stung" apple is one bearing one or more of the shallow injuries made by a codling moth larva killed while eating into the apple. A "wormy" apple is one bearing one or more of the deep injuries made by a codling moth larva which successfully eats into the core of the apple. An "injured" apple is one bearing one or more codling moth injuries of either type. A "clean" apple bears no codling moth injury of any type. A "U. S. No. 1 grade" apple, with respect to codling moth injury, may be either a "clean" apple or one bearing no more than two "sting" injuries and no "worm" injuries. Apples bearing "worm" injuries or more than two "sting" injuries go into lower grades than U. S. No. 1.

Xanthone tested against lead arsenate in the laboratory, employing various dilutions, showed marked superiority to the lead arsenate in retaining its toxicity as concentration diminished. The following table demonstrates this characteristic. The compounds were tested in the manner set forth in connection with Table No. 1 above using aqueous suspensions of the insecticide. Toxicity is expressed in terms of per cent of codling moth larvae killed.

*Table No. 3*

| Concentration | Lead arsenate | Xanthone |
|---|---|---|
| 1 | 86.7 | 100 |
| 0.5 | 86.7 | 96.7 |
| 0.25 | 80 | 93.7 |
| Check | 50 | 50 |

Where codling moth larvae and plant diseases are to be combatted simultaneously, a mixture may be used containing a compound having the xanthone structure and such commonly used supplementary materials as may be desired to improve control. For example, xanthone has been used successfully in combination with sulfur and copper fungicides to give simultaneous control of codling moth and apple diseases, and in combination with hydrated lime and tar soap to give a heavy, smooth deposit resistant to removal by rain.

I claim:

1. The method of combatting codling moth larvae infestations on pome fruit trees, which comprises spraying the trees during the growth of the calyx with lead arsenate, and thereafter during the growth of the fruit spraying the trees with a compound containing the xanthone structure.

2. The method as defined in claim 1, in which the pome fruit trees are apple trees, a lead arsenate calyx spray is applied to the apple trees and thereafter during the growth of the apples a plurality of cover sprays containing xanthone are applied to the apple trees.

3. The method of combatting codling moth larvae infestations on pome fruit trees, which comprises applying lead arsenate to the trees during the growth of the calyx, and thereafter during the growth of the fruit applying to the trees a compound having the xanthone structure as the essential insecticidal material for combatting codling moth larvae infestations, the amount of lead arsenate and compound having the xanthone structure thus applied to the trees being controlled so as to effectively protect the bulk of the fruit on the trees throughout its growth against attack by codling moth larvae and to leave an amount of lead arsenate on the fruit when picked such as to be substantially non-injurious to human beings.

4. The method as defined in claim 1 in which the compound containing the xanthone structure is a halogenated xanthone.

5. The method as defined in claim 1 in which the compound containing the xanthone structure is 3-bromo-xanthone.

6. The method as defined in claim 1 in which the compound containing the xanthone structure is an alkyl xanthone.

7. The method of combatting codling moth larvae infestations on pome fruit trees which comprises spraying the trees during the growth of the calyx with lead arsenate, and thereafter, during the growth of the fruit, spraying the trees with a compound of the group consisting of xanthones and xanthiones.

8. A method of combatting codling moth larvae infestations on pome fruit trees, which comprises applying lead arsenate to the trees during the growth of the calyx, and thereafter during the growth of the fruit applying xanthone to the trees.

JAMES WILLIAM SWAINE.